US010296443B2

(12) United States Patent
Grechanik

(10) Patent No.: US 10,296,443 B2
(45) Date of Patent: May 21, 2019

(54) AUTOMATICALLY PREDICTING FAULTS THAT CAUSED SOFTWARE FAILURES USING A MARKOV LOGIC NETWORK

(71) Applicant: The Board of Trustees of the University of Illinois, Urbana, IL (US)

(72) Inventor: Mark Grechanik, Chicago, IL (US)

(73) Assignee: The Board of Trustees of the University of Illinois, Urbana, IL (US)

( * ) Notice: Subject to any disclaimer, the term of this patent is extended or adjusted under 35 U.S.C. 154(b) by 98 days.

(21) Appl. No.: 15/286,824

(22) Filed: Oct. 6, 2016

(65) Prior Publication Data

US 2017/0103013 A1 Apr. 13, 2017

Related U.S. Application Data

(60) Provisional application No. 62/239,596, filed on Oct. 9, 2015.

(51) Int. Cl.
*G06N 5/02* (2006.01)
*G06N 5/04* (2006.01)
(Continued)

(52) U.S. Cl.
CPC .......... *G06F 11/366* (2013.01); *G06F 11/079* (2013.01); *G06F 11/3452* (2013.01);
(Continued)

(58) Field of Classification Search
CPC ........ G06N 99/005; G06N 7/00; G06N 7/005; G06N 5/00; G06N 5/04; G06N 5/041;
(Continued)

(56) References Cited

U.S. PATENT DOCUMENTS 7,827,438 B2 * 11/2010 Tarta .................. G06F 11/3668 714/4.1
8,862,728 B2 * 10/2014 Jayachandran ..... G06F 11/0754 709/224

(Continued)

OTHER PUBLICATIONS

Dijkstra E.W., Schölten C.S. "Converse predicate transformers." 1990. Chapter 11 In: Predicate Calculus and Program Semantics. Texts and Monographs in Computer Science. Springer, New York, NY. pp. 121, 125-145, 201 and 202.*

(Continued)

*Primary Examiner* — Emerson C Puente
*Assistant Examiner* — Erika Kretzmer
(74) *Attorney, Agent, or Firm* — Valauskas Corder LLC

(57) ABSTRACT

A system and methods for automatically localizing faults for functional field failures that enables users to enter symptoms of a failure that occur during deployment of a given application along with the values of the input and configuration parameters in order to return locations in the source code that are likely to contain specific faults as well as show navigation paths from a suggested to the failure such that the code may be corrected. Successful and faulty runs of a software application are executed, and used to obtain ground facts and a knowledge base. A particular formula for the ground facts and knowledge base is discussed. A Markov Logic Network (MLN) is generated from the ground facts and knowledge base. Abductive reasoning based on the MLN is used to localize faults for the user-entered functional field failures.

17 Claims, 7 Drawing Sheets

(51) Int. Cl.

| | |
|---|---|
| ***G06N 7/00*** | (2006.01) |
| ***G06F 11/07*** | (2006.01) |
| ***G06F 11/34*** | (2006.01) |
| ***G06F 11/36*** | (2006.01) |
| *G06F 8/71* | (2018.01) |

(52) U.S. Cl.
CPC ............. *G06N 5/025* (2013.01); *G06N 5/041* (2013.01); *G06N 7/005* (2013.01); *G06F 8/71* (2013.01); *G06F 11/0769* (2013.01); *G06F 11/0775* (2013.01); *G06F 11/3688* (2013.01); *G06F 11/3696* (2013.01)

(58) Field of Classification Search
CPC .......... G06N 5/042; G06N 5/046; G06N 5/02; G06N 5/022; G06N 5/025; G06F 11/30; G06F 11/34; G06F 11/3409; G06F 11/3414; G06F 11/3452; G06F 11/3466; G06F 11/3476; G06F 11/36; G06F 11/3636; G06F 11/3644; G06F 11/3664; G06F 11/3668; G06F 11/3672; G06F 11/3688
See application file for complete search history.

(56) References Cited

U.S. PATENT DOCUMENTS

| | | | | | |
|---|---|---|---|---|---|
| 9,098,621 | B2 * | 8/2015 | Zheng | G06F 11/3612 | |
| 9,176,851 | B2 * | 11/2015 | Jain | G06F 11/368 | |
| 2009/0204945 | A1 * | 8/2009 | Jain | G06F 11/368 | 717/124 |
| 2009/0307530 | A1 * | 12/2009 | Tarta | G06F 11/3668 | 714/38.14 |
| 2012/0222013 | A1 * | 8/2012 | Zheng | G06F 11/3612 | 717/125 |
| 2013/0110747 | A1 * | 5/2013 | Richardson | G06N 99/005 | 706/12 |
| 2013/0305093 | A1 * | 11/2013 | Jayachandran | G06F 11/0754 | 714/37 |

OTHER PUBLICATIONS

Richardson, Matthew and Pedro Domingos. "Markov Logic Networks." 2006. Springer, Machine Learning vol. 62. pp. 107-133.*

Zhang, Sai, and Congle Zhang. "Software Bug Localization with Markov Logic." May 31, 2014. ICSE Companion '14, ACM. pp. 424-427.*

Ghosh, Shalini, Wilfried Steiner, Grit Denker, and Patrick Lincoln. "Probabilistic Modeling of Failure Dependencies Using Markov Logic Networks." Dec. 2013. 2013 IEEE 19th Pacific Rim International Symposium on Dependable Computing. pp. 162-171. (Year: 2013).*

* cited by examiner

AUTOMATICALLY PREDICTING FAULTS THAT CAUSED SOFTWARE FAILURES USING A MARKOV LOGIC NETWORK

CROSS-REFERENCE TO RELATED APPLICATIONS

This application claims the benefit of U.S. Provisional Patent Application 62/239,596 filed Oct. 9, 2015.

FIELD OF THE INVENTION

The invention relates generally to localizing faults in software products. More specifically, the invention is directed to a system and methods for automatically localizing faults for functional field failures using the symptoms of those functional field failures. Advantageously, through use of this invention, the costs for engineering software products may be reduced.

BACKGROUND

Software is generally the expression of computer readable code with which a user interacts. A software product may be a collection of this code that is released to consumers. Before being released to consumers as a software product, software undergoes many stages of development including requirements gathering, design, coding, testing, and deployment.

Requirements gathering may encompass tasks used to determine the needs or conditions for a new or modified product. Design may include tasks implementing solutions to problems which may be determined during the requirements stage. Coding may include tasks for generating the machine readable code necessary to cause a computer processor to perform the solutions implemented in the design stage. Testing may include tasks for investigating the quality of the code generated. Deployment may include tasks for making software available as a software product.

The machine code of a software product may be further understood as instructions that direct a computer to perform a task. If the code correctly expresses the software, then the consumers may use their software product with little disruption. The code, however, may contain a fault such as an incorrect step, process, or definition in the code. The fault may then propagate to a functional field failure such as a script error appearing on a display or the abortion of a software application.

Production faults occurring in deployed software applications are one of the worst negative factors that destroys software products. A major problem is that production faults are not known by definition when the software product application is deployed. A functional field failure generally occurs after a software product is released to consumers. Thus, only when field failures occur in a deployed application can a person (i.e., programmer) begin to analyze the symptoms of failures to determine what faults can cause them. Examples of symptoms of failures include but not limited to incorrect output values, program crashes and computations that take much more time than they are supposed to, possibly indicating infinite loops.

The cost for detecting and repairing a fault for functional field failure after release to consumers is estimated to be approximately 300 times higher than during the phases of software development. In attempt to reduce costs, many have developed manual and automatic methods for detecting and repairing these faults.

According to one method, intuitive testing is used to detect and repair faults. Using this method, the person may develop an intuition about how different input values and changes to code affect the software's behavior. It may take a person long periods of time to develop an intuition. The person may then surmise probable faults which result in functional field failures. Surmising probable faults may only be accomplished after repeated trial and error. Methods like this may be difficult and time consuming.

Other methods attempt to detect and repair faults automatically. Some of these automatic methods may further use fault localization. Fault localization may include a collection of statistical techniques and algorithms for testing the behavior of software. When tested in this way, the behavior of software may be correlated with functional field failures by ranking statements of code according to the likelihood the statements contain faults. Some methods including fault localization may also be resource intensive and time consuming.

In additional methods, the values of what are termed "program predicates" may be collected from running the software. A "predicate" is generally a choice to execute or not execute an instruction. In one example, a Boolean predicate may give a value of true or false for a conditional expression. A statistical model may then be built by contrasting the values of program predicates for successful runs with those of unsuccessful runs. As a result, methods such as these may require large amounts of state information and data from both failed runs and successful runs.

Added methods may also use what are termed "oracles" to test software. An "oracle" is generally a mechanism for testing whether the software behaves correctly for specific outputs. Methods using an oracle may compare the outputs of software under testing (SUT) to outputs predicted by the oracle. Oracles often operate separately from the SUT. Creating oracles automatically may be one of the most challenging problems of software testing.

Therefore, a need exists for an efficient system and methods for detecting and repairing faults for functional field failure by automatically localizing faults without collecting extensive runtime data, without requiring manually developed oracles, without deploying instrumented applications, and without collecting large amounts of state information. This invention satisfies that need.

SUMMARY

The present invention is directed to a system and methods that may use non-transitory computer-readable media for automatically localizing faults for functional field failure. The invention automatically finds root causes of production failures in software. According to the invention, functional production faults can be automatically localized in deployed software applications with a high degree of precision using only symptoms of field failures and input values. The intuition of programmers about natures of faults is modeled by performing sensitivity analysis that speculatively constructs the predictive fault model that is specific for every software application. The predictive fault model considers the effect of different faults on the behavior of the application. This model enables users to obtain specific information on how a suggested fault results in an error state that propagates through the application to cause the failure whose symptoms are the input.

According to the invention, fault models are automatically obtained from software applications using a sensitivity analysis framework. In particular, the fault models are derived using a Probabilistic Graphical Model (PGMs), particularly a Markov Logic Network (MLN). Furthermore, production faults are localized automatically using an abductive reasoning process on the obtained MLN.

According to the invention, when coding and testing tasks are completed for a software application, the application configuration file is input to a system and methods of the invention. The configuration file of the application specifies the main class and the main methods of the application, the ranges of the values of their input parameters and configuration options and the output variables. To obtain an application-specific fault model, different faults are injected into the application and a modified version is executed using sampled input and configuration values. For purposes of this application, the software application is referred to as "software under test" or "SUT" and the modified version referred to as "modified SUT" or "modifiable SUT". The modified SUT is executed independently of and in parallel to running the original version of the application (i.e., SUT) with the same input/configuration settings. That is, this step is done before or in parallel to deployment of the application at customers' sites to speculatively determine the effects of possible faults.

A differential analysis is performed between the original and faulty runs using collected runtime information to determine how different faults affect the control and data flows as well as the values of its outputs. This sensitivity analysis does not try to localize a fault, but determines the sensitivity of the application's behavior to different faults and summarizes this in a fault model.

This analysis outputs generalized ground facts that state how injected faults affect the behavior of the application using template logic formula from a knowledge base. According to an embodiment of the invention, generalized ground facts is a formula that states $I(x,0,10) \wedge M(s,t) \rightarrow O(y,-)$, i.e., for the range of input values for the variable $x \in [0 \ldots 10]$, and the fault M of type t, into the statement s, the value of the output variable y changes to a negative.

While injecting faults, running the application and performing the subsequent differential analysis, the invention creates and updates a fault model of the application. The model is used to perform abductive inference to localize production faults.

More specifically, production faults are localized automatically using an abductive reasoning process on the obtained MLN. An MLN is a set of pairs $(F_i,w_i)$ where $F_i$ is a formula in first-order logic and $w_i$ is a real number that designates a weight for the corresponding formula. Depending on the frequency of instantiations of each clause for a given application with a set of input values, these clauses will be assigned different weights. Applying different faults, M to different statements, s will instantiate these clauses and create a ground MLN, a very large graph, whose nodes are instances of clauses (i.e., ground predicates) and the edge exists between a pair of nodes that contain predicates that appear together in some grounding of one of the corresponding formula, $F_i$. With MLN, the probability can be inferred that the value of some output will change (i.e., a possible failure) if some statements contain faults.

As mentioned above, a MLN is generated for software under testing (SUT) using inputs based on ground facts and a knowledge base. Once a production failure is observed, its symptoms are used along with the generated MLN. In order to perform abduction, the invention transforms the obtained logic formula that describe the effects of injected faults by reversing implications. By reversing the formula above, $O(y,-) \rightarrow I(x,0,10) \wedge M(s,t)$ is obtained, and abductive inference can be performed. Ranked hypotheses are computed by navigating the MLN that describe how faults in different statements in the application can result in the observed failure. These hypotheses are given to users who may use them to update the knowledge base to improve fault localization.

An architecture contemplated by the invention may include components comprising a sensitivity analyzer, MLN generator, an abductive reasoner, and a differential diagnoser. More specifically, preferred embodiments may automatically localize faults for functional field failures by: running a sensitivity analyzer to obtain generalized ground facts and knowledge base; loading generalized ground facts and knowledge base into a MLN generator to obtain a MLN; entering symptoms of a failure and the MLN into an abductive reasoner to obtain ranked hypotheses; and generating a graphical user interface on which ranked hypotheses may be displayed to communicate the localization faults for functional field failures. The invention may further input ranked hypotheses into a differential diagnoser to obtain targeted faults and direct a test script and input selector to inject the targeted fault. Additionally, the invention may further identify minor faults and inject pseudo faults to inoculate the minor production faults. According to a particular embodiment, the SUT may be received for analysis when coding and testing tasks are completed. The SUT may comprise of code for the configuration file that specifies the main class and the main methods of the software application. Alternatively, the SUT may comprise configuration information including ranges of the values for the software's input parameters, configuration options, and the output variables.

In some embodiments, the non-transitory computer-readable media may cause one or more processors to copy the SUT to provide a modifiable SUT. A sensitivity analyzer may introduce faults to the modifiable SUT obtain a modified SUT. The SUT and modifiable SUT may be run in parallel to provide diagnostic information in the form of successful and faulty runs. Further, the sensitivity analyzer performs differential analysis between successful and faulty runs of the SUT and the modifiable version of the SUT. In this way, the system and methods may determine the sensitivity of the software to different faults that affect the data flow and values of outputs from generalized ground facts and knowledge base.

Generalized ground facts and knowledge base may be obtained by running the sensitivity analyzer. The knowledge base may be code associated with underlying facts, assumptions, and rules that a computer processor may be able to process. For example, knowledge base may include applicable variables, order of variable, and the relationship between variables. Generalized ground facts may be code which identify how faults may affect the behavior of the SUT and may be expressed using template logic formula derived from the knowledge base.

For example, generalized ground facts may identify specific code for range or input values, an introduced fault, the statement code in which the fault is introduced, and the value of an output. As mentioned above, generalized ground facts may be combined with knowledge base and expressed as $I(x,0,10) \wedge M(s,t) \rightarrow O(v,-)$, i.e., for the range of input values for the variable $x \in [0 \ldots 10]$, and the fault M of type t, into the statement s, the value of the output variable y changes to a negative.

The non-transitory computer-readable media may cause one or more processors for inputting the generalized ground fact and knowledge base into a MLN generator to obtain a MLN. Generally, the MLN generator may identify formula in first order logic. The MLN generator may assign each formula a weighted value to create a node. A node is generally the parring of a formula with a value which may be weighted according to the frequency of appearances of the formula with a set of input values.

The MLN generator may further associate a node with one or more different nodes. Association or dependency—also termed in this application as an "edge"—exists between a pair of nodes that contain predicate that appear together in mutual code of corresponding formula. The collection of nodes and edges may form the MLN in which nodes represent random variables and edges specify dependencies among nodes.

The non-transitory computer-readable media may cause one or more processors to send symptoms of a failure and a MLN to an abductive reasoner. The abductive reasoner may reverse formulas that represent the effects of introduced faults which cause the symptoms of a failure, for example, the formula mentioned above $I(x,0,10) \wedge M(s,t) \rightarrow O(y,-)$ may be reversed by the abductive reasoner obtain $O(y,-) \rightarrow I(x,0,10) \wedge M(s,t)$.

The abductive reasoner may perform abductive inference by analyzing the code for the corresponding reversed formula that describe faults resulting in the symptoms of a failure. The abductive reasoner may produce ranked hypotheses according to the probability that the code corresponding to the reversed formula describing a fault results in a functional field failure.

The non-transitory computer-readable media may cause one or more processors to generate a graphical user interface on which the ranked hypotheses may be displayed. The graphical user interface may include a path capable of navigating a user from the symptoms of failure of a ranked hypothesis to the suggested fault of the ranked hypothesis. In addition, the graphical user interface may display an explanation why the statement of code associated with the suggested fault may be the root cause of the functional field failure.

In alternative embodiments, the ranked hypotheses may be sent to a differential diagnoser. The differential diagnoser may identify additional faults and inputs to test hypotheses. The differential diagnoser may then instruct a test script and input data selector what inputs and faults to inject into the modifiable SUT to test the ranked hypotheses. By injecting a specific fault in the code path of a ranked hypothesis, the nature of the functional field failure should change. For example, the sign of an output value may change. If the functional field failure does not change, then the probability that the fault of the ranked hypothesis caused the functional field failure may be decreased, and the probability of the other ranked hypotheses may be increased. The differential diagnoser may cause increased accuracy in localizing faults for functional field failures.

For example, some X faults have a common part of the code propagation path leading to a symptom of failure, and some Y faults have a different common part of the code propagation path leading to the symptom of failure. If a fault is introduced into the X common part of the code propagation path, and the symptom of failure does not change, then the likelihood that Y faults result in the symptom of failure is increased.

In other alternative embodiments, a non-transitory computer-readable media may cause a computer processor to identify minor faults and inject pseudo faults to inoculate the minor production faults. The minor fault identifier may identify known faults that do not result in functional field failures. The minor fault identifier may then determine which combinations of minor faults may be applied to inoculate faults for functional field failure. If the statement of code in the population path is inoculated against functional field failure, then the system may record the fault or combination of faults as a fault or combination of faults capable of inoculating faults against functional field failure.

One object of the present invention is to provide a new test for localizing faults for functional field failures.

A further object of the present invention is to provide a system and methods for automatically localizing faults for functional field failure without collecting runtime data, requiring oracles, contrasting successful and failed runs, and without collecting large amounts of state information.

Another object of the present invention is to provide a new tool for increasing the accuracy of automatically localizing faults for functional field failure.

An additional object of the present invention is to provide a new tool for automatically inoculating minor faults for functional field failure.

The present invention, its attributes and advantages may be further understood with reference to the detailed description of presently contemplated embodiments, taken in conjunction with the accompanying drawings.

BRIEF DESCRIPTION OF THE DRAWINGS

The preferred embodiments of the invention may be described in conjunction with the appended drawings provided to illustrate and not to limit the invention, where like designations denote like elements, and in which.

DETAILED DESCRIPTION OF THE DRAWINGS

In the following description, for purposes of explanation, specific numbers, materials, and configurations are set forth in order to provide a thorough understanding of the invention. It may be apparent, however, to one having ordinary skill in the art that the invention may be practiced without these specific details. In some instances, well-known features may be omitted or simplified so as not to obscure the present invention. Furthermore, reference in the specification to "one embodiment" or "an embodiment" means that a particular feature, structure or characteristic described in connection with the embodiment is included in at least one embodiment of the invention. The appearances of the phrase "in one embodiment" in various places in the specification are not necessarily all referring to the same embodiment.

Figure 1:
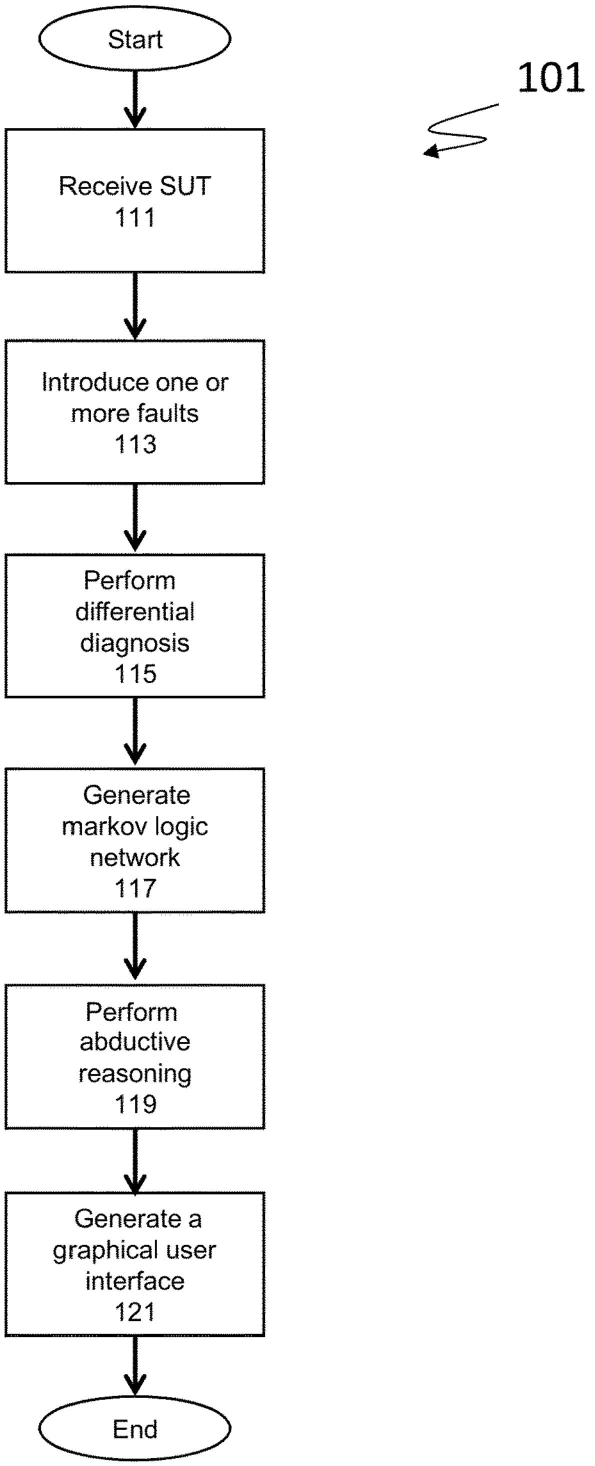
FIG. 1 illustrates a preferred embodiment of a method for automatically localizing faults for functional field failure.

FIG. 1 illustrates a preferred embodiment of a method 101 for localizing faults for functional field failures. In this particular embodiment, a processor may receive a SUT 111. The processor may introduce one or more faults to the SUT to obtain successful and faulty runs 113. The processor may perform differential diagnosis on successful and faulty runs to obtain generalized ground facts and knowledge base 115.

Generalized ground facts may be combined with a knowledge base and expressed by the formula I(x,0,10)∧ M(s,t)→O(y,–), i.e., for the range of input values for the variable x∈[0 . . . 10], and the fault M of type t, into the statement s, the value of the output variable y changes to a negative. The processor may generate a MLN from generalized ground facts and knowledge base 117 using predicates and/or logic formulae as described further below. The processor may perform abductive reasoning on the MLN to obtain ranked hypotheses 119 by reversing the formula above to O(y,–)→I(x,0,10)∧ M(s,t). The processor may generate a graphical user interface on which the ranked hypotheses may be displayed to communicate the localization of faults for functional field failures 121.

Figure 2:
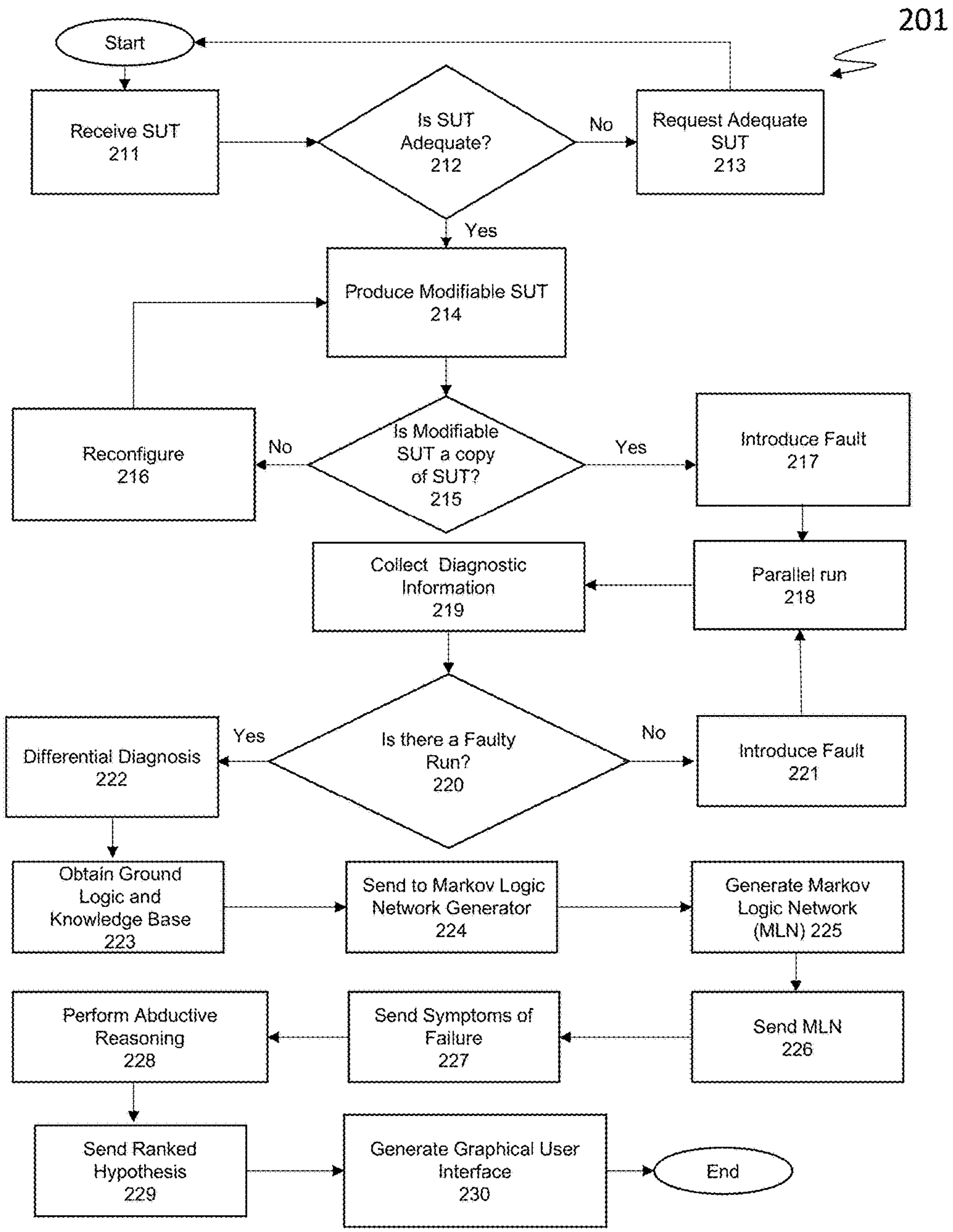
FIG. 2 illustrates another preferred embodiment of a method for automatically localizing faults for functional field failure.

FIG. 2 illustrates another preferred embodiment of a method 201 for localizing faults for functional field failures. In this particular embodiment, a processor may receive 211 a SUT and configuration information to start the process. A SUT and configuration files may additionally be obtained from a client server or computer. The processor may determine 212 whether an adequate SUT and/or adequate configuration information was received.

An adequate SUT and/or adequate configuration information may comprise at least the configuration file that specifies the main class and the main methods of the software or information including ranges of the values for the software's input parameters, configuration options, and the output variables. If the processor did not receive an adequate SUT and/or adequate configuration information, then the processor may request 213 an adequate SUT and/or adequate configuration information from a client server or computer. If the processor did receive, or when it does receive an adequate SUT and adequate configuration information, then the processor may configure 214 a modifiable SUT.

The processor may identify 215 whether the modifiable SUT is a copy of the SUT. If the modifiable SUT is not a copy of the SUT, then the processor may reconfigure 216 the modifiable SUT so it is a copy of the SUT. If the modifiable SUT is a copy of the SUT, then the processor may cause a sensitivity analyzer to introduce 217 faults to the modifiable SUT to obtain a modified SUT. The modified SUT and the SUT may then run 218 in parallel. At this point, a processor may cause the sensitivity analyzer to collect 219 diagnostic information from the modified SUT and the SUT.

The processor may then identify 220 whether the modified SUT had faulty runs, and whether the SUT had successful runs. The processor may cause the sensitivity analyzer to introduce 221 an additional one or more faults to the modifiable SUT to obtain further modified SUT. If the modified SUT did have faulty runs, then the processor may cause the sensitivity analyzer to perform 222 differential diagnosis on the faulty runs and successful runs to obtain 223 generalized ground facts and knowledge base.

The processor may send or cause the sensitivity analyzer to send 224 generalized ground facts and knowledge base to a MLN generator. The processor may cause the MLN generator to generate 225 a MLN from the generalized ground facts and the knowledge base. The processor may send or cause the MLN generator to send 226 the MLN to an abductive reasoner. The processor may cause symptoms of the failure to be sent 227 to the abductive reasoner.

The processor may cause the abductive reasoner to perform 228 abductive reasoning on the MLN and the symptoms of failure to obtain ranked hypotheses. The processor may send or cause the abductive reasoner to send 229 the ranked hypotheses to a display. The processor may cause the display to generate 230 a graphical user interface on which the ranked hypotheses may be displayed.

Figure 3:
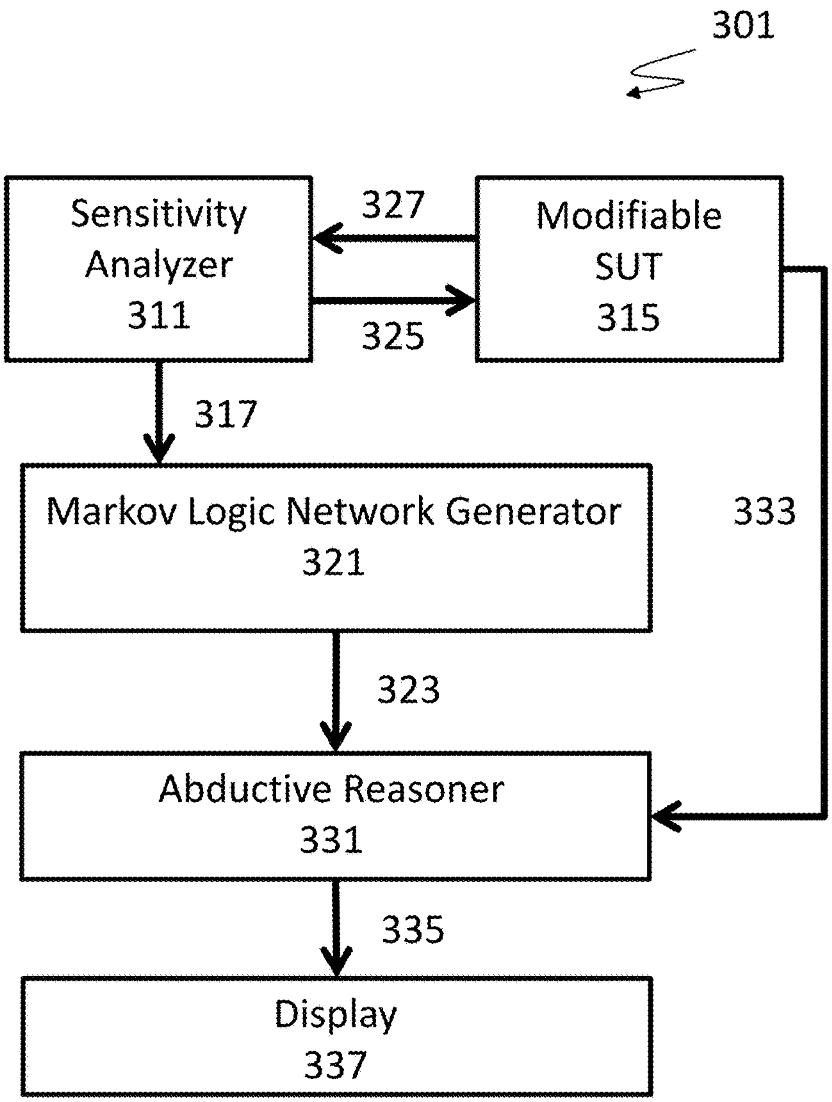
FIG. 3 illustrates a preferred embodiment of a system for automatically localizing faults for functional field failure.

FIG. 3 illustrates a preferred embodiment of the invention capable of automatically localizing faults for functional field failure. In certain preferred embodiments, the system 301 may include a sensitivity analyzer 311, a modifiable SUT 315, a MLN generator 321, an abductive reasoner 331, and a display 337.

The sensitivity analyzer 11 may introduce faults 325 to a modifiable SUT 315 to obtain faulty runs 327. The sensitivity analyzer 311 may compare the faulty runs to successful runs of an SUT to obtain generalized ground logic and knowledge base. The sensitivity analyzer 311 may send 317 generalized ground facts and knowledge base to a MLN generator 321 to obtain a MLN. The MLN generator 321 may send 323 a MLN to an abductive reasoner 331. The abductive reasoner 331 may collect 333 symptoms of failure from the modifiable SUT 315. The abductive reasoner 331 may perform abductive reasoning on the MLN and symptoms of failure to obtain ranked hypotheses. The abductive reasoner 331 may send ranked hypotheses to a display 337 to generate a graphical user interface on which ranked hypotheses may be displayed to communicate the localization of faults for functional field failures.

In some embodiments, the sensitivity analyzer 311 may perform various tasks. The sensitivity analyzer 311 may produce a modifiable SUT 315 from inputs. The sensitivity analyzer 311 may also introduce faults to the modifiable SUT 315. The sensitivity analyzer 311 may additionally collect diagnostic information. Also, the sensitivity analyzer 311 may run differential diagnoses on diagnostic information. Additionally, the sensitivity analyzer may send generalized ground facts and knowledge base to a MLN generator.

The sensitivity analyzer 311 may further include a programmable failure injection tool that may identify a narrow range of failures from a broader range of failures. In addition, the sensitivity analyzer 315 may include search-based sampling approaches for identifying faults to be introduced which have less probability of causing combinatorial explosion. Still further, the sensitivity analyzer may use algorithms for combinatorial interaction testing capable of narrowing the configurations for running the modifiable SUT.

In other embodiments, the MLN generator 321 may receive the generalized ground facts and knowledge base as one or more predicates and logic formulae expressed as a template. A lower number of predicates and formulae may cause increased efficiency in localizing faults, while a larger number of predicates and formulae may cause increased precision in localizing faults. The template of the one or more predicates and logic formulae may include for example:

(1) ForhasFault(s,m)∧ StateDiffers(s)⇒ Infected(s) as an infection fault rule: If the fault m is injected into the statement s and the state of the mutated application after executing s differs from the state of the original application, then the state is infected at the statement s;

(2) Infected(s)∧ (cfDepends(s,t) V dfDepends (s,t))⇒ Infected(t) as a propagation rule: If the statement s is infected and some other statement controls, the type of fault t and dataflow are dependent on s, then t is infected;

(3) Infected(s)∧ (cfDepends(o,s)∧ Reached(o)⇒Failed (o,p) as an output failure rule: If the statement s is infected and the execution reaches the output o that is dataflow dependent on s, then o has failed with the symptom p that depends on the type of o (e.g., sign changed from negative to positive);

(4) Infected(s) ∧ dfDepends(o,s)∧ BranchDiffers (s,t)⇒¬ Reached(o)∧ Failed(o) as a control flow change rule: If the statement s is infected and the output o is dataflow dependent on s, however, a branch condition is modified, so that the o's value is not computed, then o is not reached and it is failed; and (5) Input(o,s)∧ Failed(o)⇒Infected(s) as a transitive infection rule: If the output o is a failure and it serves as the input to some other component's statement s then this statement is infected.

Once the template is defined by the selected predicates and logic formulae, then the MLN generator 321 may assign weights according to the frequency of code appearing in the software which correspond to the formulas. Assigning weights to formulas creates nodes. When nodes contain predicates that appear together in mutual code of corresponding formula, an edge is formed between the nodes. The collection of nodes and edges form a MLN.

In some preferred embodiments, the MLN is analyzed by an abductive reasoner 331 from outputs in consequents of the formula to the antecedents that match predicates "hasFault" and "Infected". For example, if there is only one fault and one functional field failure in the MLN, then the abductive reasoner may reverse the implications of the logic formula and deduce the fault by applying the reversed formula.

Once the formula is reversed, the abductive reasoner 331 may be used for analyzing code from symptoms of failures to suggested faults with ranked hypotheses. The abductive reasoner 331 may further determine an explanation for why a statement of code is likely to be the root cause of the functional field failure. For example, an explanation may show that the statement of code contains an improper step. The explanations of the ranked hypotheses become important when a functional field failure cannot be localized to one or two statements of code.

In some embodiments, non-transitory computer readable media storing a computer program may cause one or more computer processors to generate a graphical user interface on which ranked hypotheses may be displayed. The ranked hypotheses may be displayed as any human-readable language including but not limited to: the logic formula expressed as templates; general-purpose programming language; American Standard Code for Information Exchange (ASCII); Basic Latin (Unicode block); HTML decimal character rendering; Extensible Markup Language; etc, In addition, the ranked hypotheses may be displayed with a numerical rank according to the likelihood of a fault causing a functional field failure. Further, the ranked hypotheses may be displayed with an explanation relating to a reason for why the fault may cause the functional field failure.

Figure 4:
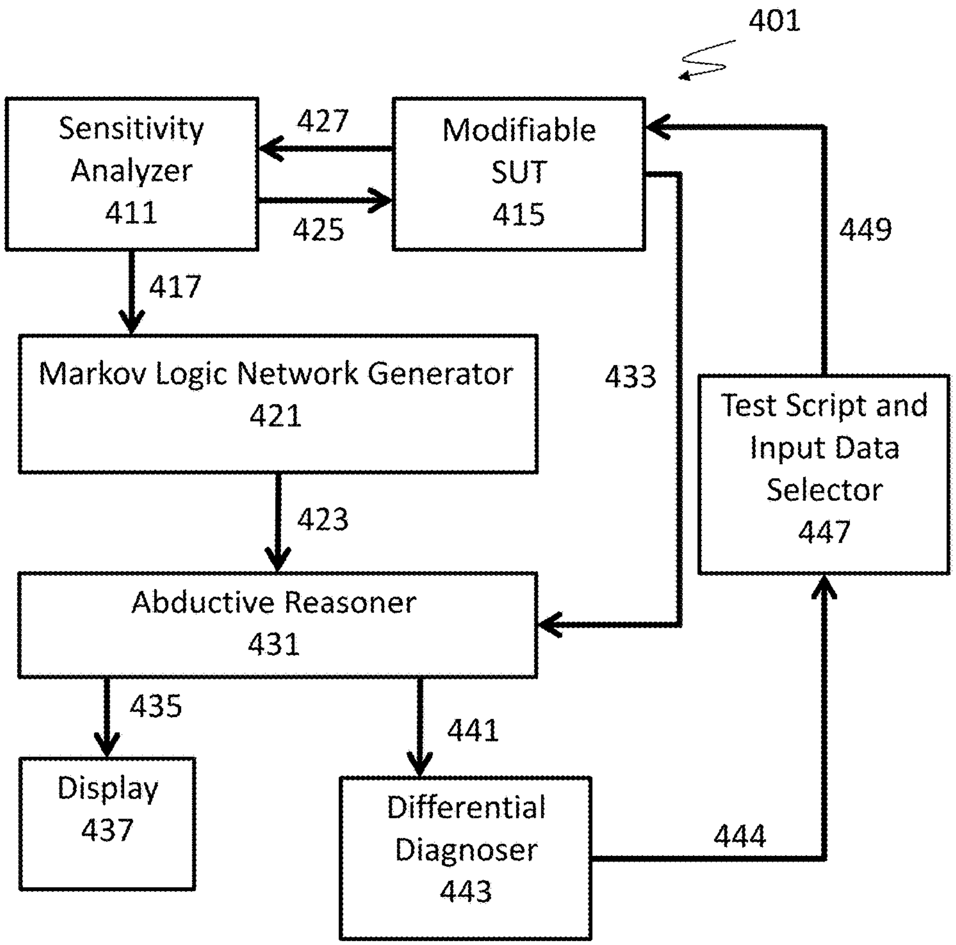
FIG. 4 illustrates an additional preferred embodiment of the invention for automatically and more accurately identifying faults for functional field failure.

FIG. 4 illustrates an alternative preferred embodiment of the invention capable of automatically and more accurately identifying faults for functional field failure. In some embodiments, the system 401 may include a sensitivity analyzer 411, a modifiable SUT 415, a MLN generator 421, an abductive reasoner 431, a differential diagnoser 443, a test script and input data selector 447, and a display 437.

The sensitivity analyzer 411 may introduce faults 425 to a modifiable SUT 415 to obtain faulty runs 427. The sensitivity analyzer 411 may compare the faulty runs to successful runs of an SUT to obtain generalized ground logic and knowledge base. The sensitivity analyzer 411 may send 417 generalized ground facts and knowledge base to a MLN generator 421 to obtain a MLN.

The MLN generator 421 may send 423 a MLN to an abductive reasoner 431. The abductive reasoner 431 may collect 433 symptoms of failure from the modifiable SUT 415. The abductive reasoner 431 may perform abductive reasoning on the MLN and symptoms of failure to obtain ranked hypotheses. The abductive reasoner 431 may send ranked hypotheses to a differential diagnoser 443. The differential diagnoser 443 may determine additional inputs and faults to test the ranked hypotheses.

The differential diagnoser 443 may send 444 the additional inputs and faults to a test script and input data selector 447. The test script and input data selector 447 may inject 449 the additional inputs and faults into the modifiable SUT 415. The abductive reasoner 431 may update the ranked hypotheses, and send 435 them to a display 437. A graphical user interface may display the updated ranked hypotheses.

In some embodiments, the differential diagnoser 443 may identify more and different faults 449 to be injected into the statements of code corresponding to the ranked hypotheses. The test script and input data selector may then inject the faults into the code propagating to a functional field failure. In this way, the system may differentiate functional field failures at the same output by the different symptoms of failure the injected faults produce. For example, one fault resulting in a change to the sign of an output value, and another fault resulting in a change to the amount of the output value may be differentiated using a language-independent slicing technique.

Figure 5:
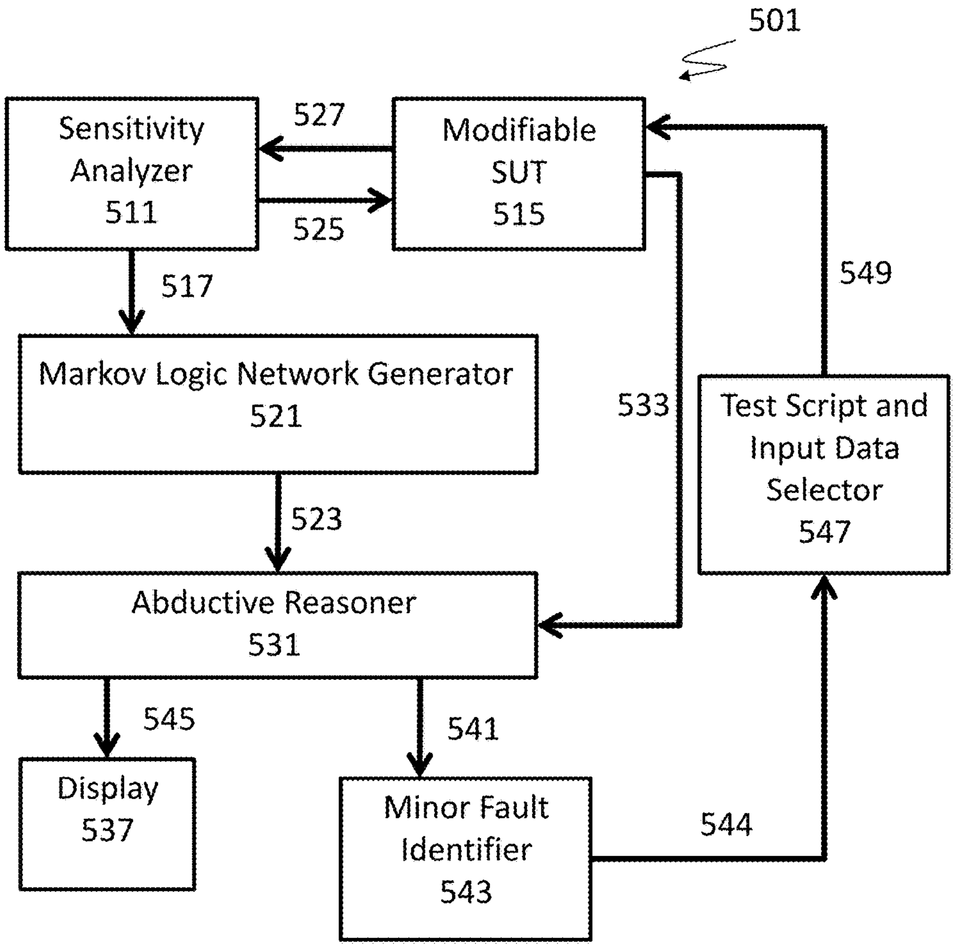
FIG. 5 illustrates an alternative preferred embodiment of the invention for automatically inoculating minor faults from functional field failure.

FIG. 5 illustrates an alternative embodiment of the invention capable of automatically inoculating minor faults from functional field failure. In some embodiments, a system 501 may include a sensitivity analyzer 511, a modifiable SUT 515, a MLN generator 521, an abductive reasoner 531, a minor fault identifier 543, a test script and input data selector 547, and a display 537.

The sensitivity analyzer 511 may introduce faults 525 to a modifiable SUT 515 to obtain faulty runs 527. The sensitivity analyzer 511 may compare the faulty runs to successful runs of an SUT to obtain generalized ground logic and knowledge base. The sensitivity analyzer 511 may send 517 generalized ground facts and knowledge base to a MLN generator 521 to obtain a MLN.

The MLN generator 521 may send 523 a MLN to an abductive reasoner 531. The abductive reasoner 531 may collect 533 symptoms of failure from the modifiable SUT 515. The abductive reasoner 531 may perform abductive reasoning on the MLN and symptoms of failure to obtain ranked hypotheses. The abductive reasoner 531 may send ranked hypotheses to a minor fault identifier 543.

The minor fault identifier 543 may determine which faults do not result in functional field failures, and identify combinations of faults inoculate against functional field failure. The minor fault identifier 543 may send 544 faults and/or combinations of faults to a test script and input data selector 547. The test script and input data selector 547 may inject 549 the faults and/or combinations of faults into the modifiable SUT 515. The abductive reasoner 531 may update the ranked hypotheses, and send 535 them to the minor fault identifier 543 to determine whether the faults/or combinations of faults inoculated against failure. In addition, updated ranked hypotheses may be sent 545 to a display 537 on which graphical user interface may display the updated ranked hypotheses.

In some embodiments, the minor fault identifier 543 may identify faults which do not result in functional field failures. The fault identifier 543 may cause the test script and input data selector 547 to inject 549 faults and/or combinations of faults into the modifiable SUT 515. In this way, the system 501 may collect, record, and store faults which do not result in functional field failures. The system 501 may further inject combination of faults that do not result in functional field failure to statements of code known to result in functional field failure. The system 501 may determine whether one or more combinations of faults that do not result in functional field failure inoculate the statement of code from functional field failure, and collect, record and store the inoculating fault. The system 501 may further inject 549 the inoculating fault into additional statements of code which are known to cause functional field failure.

Figure 6:
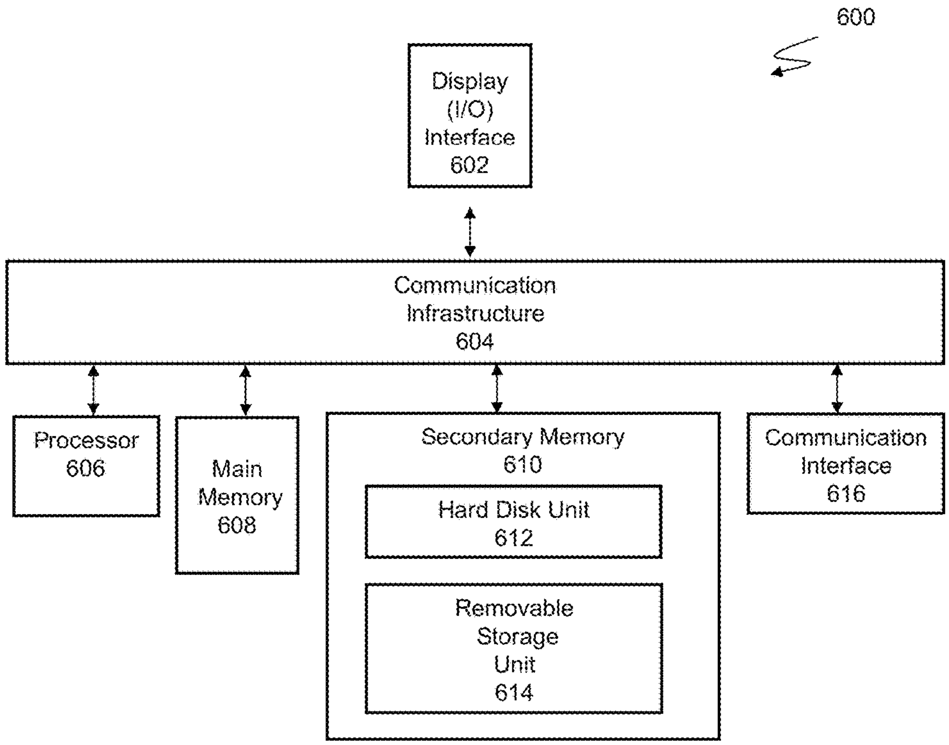
FIG. 6 illustrates a diagram of an embodiment of a computer system.

FIG. 6 illustrates a diagram of a system which may be an embodiment of the present invention. Computer system 600 includes an input/output interface 602 connected to communication infrastructure 604—such as a bus—, which forwards data such as graphics, text, and information, from the communication infrastructure 604 or from a frame buffer (not shown) to other components of the computer system 600. The input/output interface 602 may be, for example, a display device, a keyboard, touch screen, joystick, trackball, mouse, monitor, speaker, printer, Google Glass® unit, web camera, any other computer peripheral device, or any combination thereof, capable of entering and/or viewing data.

Computer system 600 includes one or more processors 606, which may be a special purpose or a general-purpose digital signal processor configured to process certain information. Computer system 600 also includes a main memory 608, for example random access memory (RAM), read-only memory (ROM), mass storage device, or any combination thereof. Computer system 600 may also include a secondary memory 610 such as a hard disk unit 612, a removable storage unit 614, or any combination thereof. Computer system 600 may also include a communication interface 616, for example, a modem, a network interface (such as an Ethernet card or Ethernet cable), a communication port, a PCMCIA slot and card, wired or wireless systems (such as Wi-Fi, Bluetooth, Infrared), local area networks, wide area networks, intranets, etc.

It is contemplated that the main memory 608, secondary memory 610, communication interface 616, or a combination thereof, function as a computer usable storage medium, otherwise referred to as a computer readable storage medium, to store and/or access computer software including computer instructions. For example, computer programs or other instructions may be loaded into the computer system 600 such as through a removable storage device, for example, a floppy disk, ZIP disks, magnetic tape, portable flash drive, optical disk such as a CD or DVD or Blu-ray, Micro-Electro-Mechanical Systems (MEMS), nanotechnological apparatus. Specifically, computer software including computer instructions may be transferred from the removable storage unit 614 or hard disc unit 612 to the secondary memory 610 or through the communication infrastructure 604 to the main memory 608 of the computer system 600.

Communication interface 616 allows software, instructions and data to be transferred between the computer system 600 and external devices or external networks. Software, instructions, and/or data transferred by the communication interface 616 are typically in the form of signals that may be electronic, electromagnetic, optical or other signals capable of being sent and received by the communication interface 616. Signals may be sent and received using wire or cable, fiber optics, a phone line, a cellular phone link, a Radio Frequency (RF) link, wireless link, or other communication channels.

Computer programs, when executed, enable the computer system 600, particularly the processor 606, to implement the methods of the invention according to computer software including instructions.

The computer system 600 described may perform any one of, or any combination of, the steps of any of the methods according to the invention. It is also contemplated that the methods according to the invention may be performed automatically.

The computer system 600 of FIG. 6 is provided only for purposes of illustration, such that the invention is not limited to this specific embodiment. It is appreciated that a person skilled in the relevant art knows how to program and implement the invention using any computer system.

The computer system 600 may be a handheld device and include any small-sized computer device including, for example, a personal digital assistant (PDA), smart hand-held computing device, cellular telephone, or a laptop or netbook computer, hand held console or MP3 player, tablet, or similar hand held computer device, such as an iPad®, iPad Touch® or iPhone®.

Figure 7:
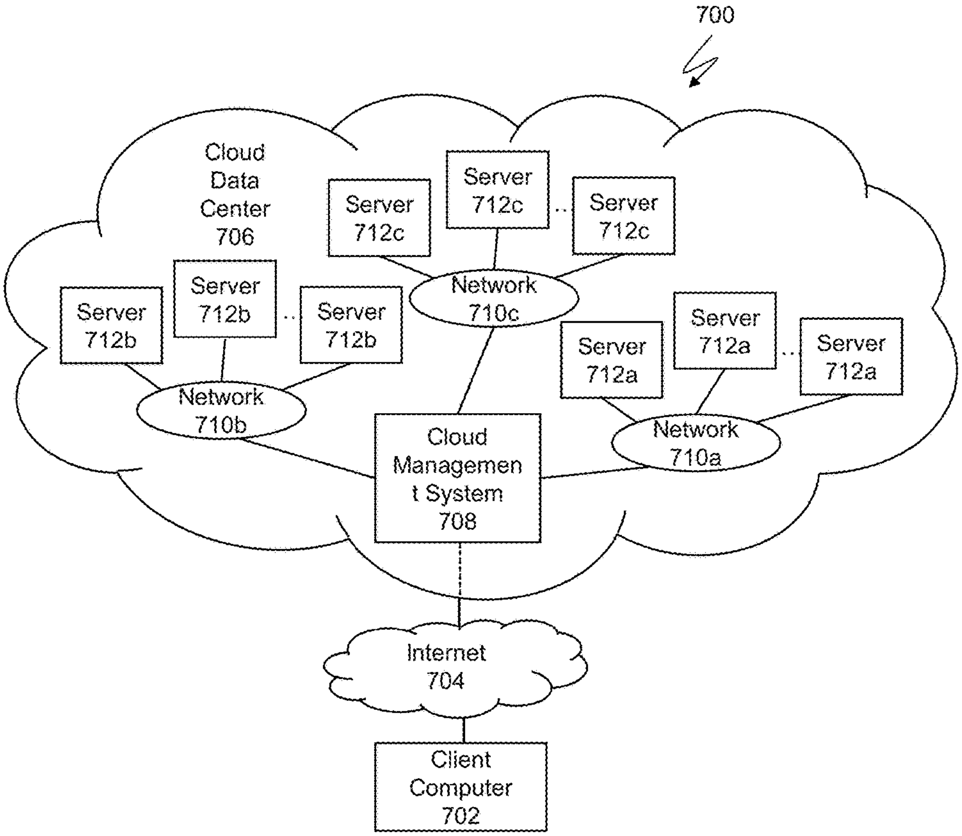
FIG. 7 illustrates a diagram of an embodiment of a cloud computing system.

FIG. 7 illustrates an exemplary cloud computing system 700 that may be an embodiment of the present invention. The cloud computing system 700 includes a plurality of interconnected computing environments. The cloud computing system 700 utilizes the resources from various networks as a collective virtual computer, where the services and applications can run independently from a particular computer or server configuration making hardware less important.

Specifically, the cloud computing system 700 includes at least one client computer 702. The client computer 702 may be any device through the use of which a distributed computing environment may be accessed to perform the methods disclosed herein, for example, a traditional computer, portable computer, mobile phone, personal digital assistant, tablet to name a few. The client computer 702 includes memory such as random access memory (RAM), read-only memory (ROM), mass storage device, or any combination thereof. The memory functions as a computer usable storage medium, otherwise referred to as a computer readable storage medium, to store and/or access computer software and/or instructions.

The client computer 702 also includes a communications interface, for example, a modem, a network interface (such as an Ethernet card), a communications port, a PCMCIA slot and card, wired or wireless systems, etc. The communications interface allows communication through transferred signals between the client computer 702 and external devices including networks such as the Internet 704 and cloud data center 706. Communication may be implemented using wireless or wired capability such as cable, fiber optics, a phone line, a cellular phone link, radio waves or other communication channels.

The client computer 702 establishes communication with the Internet 704—specifically to one or more servers—to, in turn, establish communication with one or more cloud data centers 706. A cloud data center 706 includes one or more networks 710*a*, 710*b*, 710*c* managed through a cloud management system 708. Each network 710*a*, 710*b*, 710*c* includes resource servers 712*a*, 712*b*, 712*c*, respectively. Servers 712*a*, 712*b*, 712*c* permit access to a collection of computing resources and components that can be invoked to instantiate a virtual machine, process, or other resource for a limited or defined duration. For example, one group of resource servers can host and serve an operating system or components thereof to deliver and instantiate a virtual machine. Another group of resource servers can accept requests to host computing cycles or processor time, to supply a defined level of processing power for a virtual machine. A further group of resource servers can host and serve applications to load on an instantiation of a virtual machine, such as an email client, a browser application, a messaging application, or other applications or software.

The cloud management system 708 can comprise a dedicated or centralized server and/or other software, hardware, and network tools to communicate with one or more networks 710*a*, 710*b*, 710*c*, such as the Internet or other public or private network, with all sets of resource servers 712*a*, 712*b*, 712*c*. The cloud management system 708 may be configured to query and identify the computing resources and components managed by the set of resource servers 712*a*, 712*b*, 712*c* needed and available for use in the cloud data center 706. Specifically, the cloud management system 708 may be configured to identify the hardware resources and components such as type and amount of processing power, type and amount of memory, type and amount of storage, type and amount of network bandwidth and the like, of the set of resource servers 712*a*, 712*b*, 712*c* needed and available for use in the cloud data center 706. Likewise, the cloud management system 708 can be configured to identify the software resources and components, such as type of Operating System (OS), application programs, and the like, of the set of resource servers 712*a*, 712*b*, 712*c* needed and available for use in the cloud data center 706.

The present invention is also directed to computer products, otherwise referred to as computer program products, to provide software to the cloud computing system 700. Computer products store software on any computer useable medium, known now or in the future. Such software, when executed, may implement the methods according to certain embodiments of the invention. Examples of computer useable mediums include, but are not limited to, primary storage devices (e.g., any type of random access memory), secondary storage devices (e.g., hard drives, floppy disks, CD ROMS, ZIP disks, tapes, magnetic storage devices, optical storage devices, Micro-Electro-Mechanical Systems (MEMS), nanotechnological storage device, etc.), and communication mediums (e.g., wired and wireless communications networks, local area networks, wide area networks, intranets, etc.). It is to be appreciated that the embodiments described herein may be implemented using software, hardware, firmware, or combinations thereof.

The cloud computing system 700 of FIG. 7 is provided only for purposes of illustration and does not limit the invention to this specific embodiment. It is appreciated that a person skilled in the relevant art knows how to program and implement the invention using any computer system or network architecture.

While the disclosure is susceptible to various modifications and alternative forms, specific exemplary embodiments of the invention have been shown by way of example in the drawings and have been described in detail. It should be understood, however, that there is no intent to limit the disclosure to the particular embodiments disclosed, but on the contrary, the intention is to cover all modifications, equivalents, and alternatives falling within the scope of the disclosure as defined by the appended claims.

The invention claimed is:

1. A method for localizing faults of a field failure, comprising the steps of:

a. Executing a software under test application to obtain successful runs, the software under test application comprising a configuration file, wherein the configuration file specifies one or more selected from the group of: a main class of the software under test application, a main method of the software under test application, a range of values of input parameters and configuration options, and one or more output variables;

b. Introducing one or more faults to the software under test application to obtain faulty runs, wherein each faulty run includes a failed output;

c. Performing differential diagnosis on the successful runs and the faulty runs to obtain ground facts and a knowledge base using a formula $I(x,0,10) \wedge M(s,t) \rightarrow O(y,-)$ for the range of values of the input parameters $x \in [0 \ldots 10]$ for an output variable y, and the one or more introduced faults M of type t, into a statement s, a value of the output variable y changes to a negative;

d. Generating a Markov Logic Network (MLN) from the ground facts and the knowledge base, wherein the MLN is generated using one or more predicates and/or logic formulae selected from the group:

(1) an infection fault rule: if the one or more introduce faults M is injected into the statement s and a state of a mutated software under test application after executing the statement s differs from a state of the original software under test application, then the state of the original software under test application is infected at the statement s;

(2) a propagation rule: if the statement s is infected and an other statement s2 controls, then the other statement s2 is infected;

(3) an output failure rule: if the statement s is infected and an executed software under test application reaches the output o that is dataflow dependent on the statement s, then the output o failed with a symptom p that depends on the output o;

(4) a control flow change rule: if the statement s is infected and the output o is dataflow dependent on the statement s and a branch condition is modified so that the value of the output o is not computed, then the output o fails; and (5) a transitive infection rule: if the output o is a failure and it serves as an input parameter to the other statement s2, then the other statement s2 is infected;

e. Deploying a software application, wherein the deployed software application includes one or more field failures;

f. Performing abductive reasoning on both the MLN and symptoms of the one or more field failures to obtain ranked hypotheses predicting a localization of one or more faults of each field failure in the deployed software application; and g. Generating a graphical user interface on which the ranked hypotheses are displayed.

2. The method according to claim 1 further comprising the step of determining whether the software under test application and the configuration file specify a main class, a main methods of the software under test application, ranges of the values for the software's input parameters, configuration options, or the output variables.

3. The method according to claim 1 further comprising the step of producing a modifiable software application from the software under test application and the configuration file.

4. The method according to claim 3 further comprising the step of determining whether the modifiable software application is a copy of the software under test application.

5. The method according to claim 3 further comprising the step of reconfiguring the modifiable software application to make it a copy of the software under test application.

6. The method according to claim 3 further comprising the step of running the software under test application in parallel with the modifiable software application.

7. The method according to claim 6 further comprising the step of collecting diagnostic information from the running step.

8. The method according to claim 7 further comprising the step of determining whether there was a faulty run.

9. The method according to claim 3 further comprising the step of injecting faults and inputs into the modifiable software application.

10. The method according to claim 1, wherein the introducing step further comprises introducing one or more additional faults.

11. The method according to claim 1 further comprising the step of identifying the faults that do not result in failure.

12. The method according to claim 1, wherein the abductive reasoning is represented as a formula $O(y,-)\rightarrow I(x,0,10)\wedge M(s,t)$.

13. A system useful in identifying and locating faults for failures, the system comprising a processor in communication with:

a. a sensitivity analyze instructed to introduce one or more faults in a software under test application;

b. a modifiable software under test application comprising the one or more faults introduced to the software under test application resulting in successful runs and faulty runs, wherein each faulty run includes a failed output;

c. a Markov Logic Network (MLN) generator comprising ground facts and a knowledge base using a formula $I(x,0,10)\wedge M(s,t)\rightarrow O(y,-)$ for a range of values of input parameters $x\in[0 \ldots 10]$ for an output variable y, and the one or more introduced faults M of type t, into a statement s, a value of the output variable y changes to a negative, the MLN generator instructed to generate a Markov Logic Network (MLN) from the ground facts and the knowledge base, wherein the MLN further comprises one or more predicates and/or logic formulae selected from the group:

(1) an infection fault rule: if the one or more introduced faults M is injected into the statement s and a mutated application after executing the statement s differs from a state of the original software under test application, then the state of the original software under test application is infected at the statement s;

(2) a propagation rule: if the statement s is infected and an other statement s2 controls, then the other statement s2 is infected;

(3) an output failure rule: if the statement s is infected and an executed software under test application reaches the output o that is dataflow dependent on the statement s, then the output o failed with a symptom p that depends on the output o;

(4) a control flow change rule: if the statement s is infected and the output o is dataflow dependent on the statement s and a branch condition is modified so that the value of the output o is not computed, then the output o has failed; and (5) a transitive infection rule: if the output o is a failure and it serves as an input parameter to the other statement s2, then the other statement s2 is infected;

d. a deployed software application including one or more field failures;

e. an abductive reasoner instructed to perform abductive reasoning on both the MLN and symptoms of the one or more field failures to obtain one or more ranked hypotheses, each directed to a prediction of a localization of one or more faults for each field failure in the deployed software application; and f. a display by which the one or more faults is illustrated.

14. The system from claim 13, wherein the system further comprises a differential diagnoser instructed to introduce additional faults into the software under test application for testing the one or more ranked hypotheses.

15. the system from claim 14, wherein the system further comprises a test script and input data selector instructed to inject the additional faults into the software under test application.

16. the system from claim 14, wherein the system further comprises a minor fault identifier instructed to identify known faults that do not result in failures.

17. The system from claim 16, wherein the system further comprises a test script and input data selector instructed to inject the known faults into the software under test application.

* * * * *